US012220886B2

(12) United States Patent
Tsiberidis et al.

(10) Patent No.: US 12,220,886 B2
(45) Date of Patent: Feb. 11, 2025

(54) TIRE REPAIR KIT AND METHOD FOR INFLATING AND/OR SEALING A TIRE

(71) Applicant: KT PROJEKTENTWICKLUNGS-GMBH, Heilbronn (DE)

(72) Inventors: Konstantin Tsiberidis, Untergruppenbach (DE); Martin Spindler, Herdwangen-Schoenach (DE)

(73) Assignee: KT PROJEKTENTWICKLUNGS-GMBH, Heilbronn (DE)

( * ) Notice: Subject to any disclaimer, the term of this patent is extended or adjusted under 35 U.S.C. 154(b) by 13 days.

(21) Appl. No.: 18/273,603

(22) PCT Filed: Jan. 25, 2022

(86) PCT No.: PCT/EP2022/051553
§ 371 (c)(1),
(2) Date: Jul. 21, 2023

(87) PCT Pub. No.: WO2022/157372
PCT Pub. Date: Jul. 28, 2022

(65) Prior Publication Data
US 2024/0109261 A1    Apr. 4, 2024

(30) Foreign Application Priority Data
Jan. 25, 2021 (DE) .......................... 102021101463.8

(51) Int. Cl.
*B29C 73/16* (2006.01)
*B60C 23/10* (2006.01)
*B29L 30/00* (2006.01)

(52) U.S. Cl.
CPC ............ *B29C 73/166* (2013.01); *B60C 23/10* (2013.01); *B29L 2030/00* (2013.01)

(58) Field of Classification Search
CPC . B60C 23/004; B60C 23/10; B60C 23/00318; B60C 23/127
(Continued)

(56) References Cited

U.S. PATENT DOCUMENTS 2,415,618 A * 2/1947 West ................... F04B 39/0005
92/182
5,667,606 A * 9/1997 Renier ................. B60C 23/127
417/233
(Continued)

FOREIGN PATENT DOCUMENTS

AU    2022211147 A1    7/2022
CN    107405844 A    11/2017
(Continued)

OTHER PUBLICATIONS

Machine Translation of Oct. 4, 2024 JP Office Action for 2023-544640 (Year: 2024).*
(Continued)

*Primary Examiner* — Timothy P. Kelly
(74) *Attorney, Agent, or Firm* — Barnes & Thornburg LLP (57) ABSTRACT

A tire repair kit is described for inflating and/or sealing a tire mounted on a rim of a vehicle wheel. The tire repair kit may include a support body configured to be replaceably received in a central recess of the vehicle wheel rim, and a compressor unit including a drive and a compressor portion having at least one working chamber. The drive may be received inside of the support body, and the compressor portion may be releasably connected to a flange region of the support body and is outside of the supporting body. With the supporting body received in the central recess of the vehicle wheel, the drive of the compressor unit is arranged at least in certain regions of the central recess and the compressor (Continued)

portion of the compressor unit is completely outside the central recess.

15 Claims, 5 Drawing Sheets

(58) Field of Classification Search
USPC .................................................. 152/418–419
See application file for complete search history.

(56) References Cited

U.S. PATENT DOCUMENTS

| | | | | |
|---|---|---|---|---|
| 5,947,696 | A * | 9/1999 | Baumgarten | ........... F04B 35/06 |
| | | | | 417/233 |
| 2008/0029181 | A1 | 2/2008 | Marini | |
| 2012/0234447 | A1* | 9/2012 | Narloch | .................. B60C 23/10 |
| | | | | 152/418 |
| 2018/0222137 | A1 | 8/2018 | Shemesh | |
| 2019/0023091 | A1 | 1/2019 | Spindler et al. | |
| 2019/0143765 | A1 | 5/2019 | Richardson | |
| 2020/0062052 | A1 | 2/2020 | Easley | |
| 2020/0070450 | A1 | 3/2020 | Tsiberidis | |
| 2024/0239063 | A1* | 7/2024 | Tsouroukidou | ....... B29C 73/166 |

FOREIGN PATENT DOCUMENTS

| | | |
|---|---|---|
| CN | 108496002 A | 9/2018 |
| CN | 111886143 A | 11/2020 |
| DE | 202005017071 U1 | 3/2007 |
| DE | 202005021981 U1 | 3/2012 |
| DE | 202015005253 U1 | 8/2015 |
| DE | 102015115642 A1 | 3/2017 |
| DE | 102016119272 A1 | 4/2018 |
| DE | 102016122735 A1 | 5/2018 |
| DE | 102021101463 A1 | 7/2022 |
| EP | 0972616 A2 | 1/2000 |
| EP | 1914062 A1 | 4/2008 |
| JP | 2018507134 A | 3/2018 |
| JP | 2018510094 A | 4/2018 |
| WO | 2016138972 A1 | 9/2016 |
| WO | 2017049075 A3 | 5/2017 |
| WO | 2018134005 A1 | 7/2018 |
| WO | 2019143814 A1 | 7/2019 |
| WO | 2022157372 A1 | 7/2022 |

OTHER PUBLICATIONS

PCT International Search Report and Written Opinion completed by the ISA/EP on Apr. 28, 2022 and issued in connection with PCT/EP2022/051553.
Official Action dated Aug. 11, 2021 and issued in connection with DE 10 2021 101 463.8.
International Preliminary Report on Patentability completed by the ISA/EP on Nov. 18, 2022 and issued in connection with PCT/EP2022/051553.
Examination Report for corresponding CN application No. 202280014753.0, dated Jan. 30, 2024.
PCT International Search Report and Written Opinion completed by the ISA/EP on Jul. 17, 2023 and issued in connection with PCT/EP2022/085045.

* cited by examiner

TIRE REPAIR KIT AND METHOD FOR INFLATING AND/OR SEALING A TIRE

CROSS-REFERENCE TO RELATED APPLICATIONS

This is a national stage entry of International Patent Application No. PCT/EP2022/051553, filed Jan. 25, 2022, which claims the benefit of and priority to German Patent Application No. 10 2021 101 463.8, filed Jan. 25, 2021, the disclosures of which are expressly incorporated herein by reference in their entireties.

FIELD

The invention relates in general to methods and devices for inflating and/or sealing a vehicle tire, and in particular for dispensing an agent for sealing an inflatable object, in particular a tire, from a container.

BACKGROUND AND SUMMARY

Specifically, the invention relates in particular to a tire repair kit for inflating and/or sealing, as required, a tire mounted on a rim of a vehicle wheel. Such a tire repair kit can be used as what is referred to as a breakdown kit, for example as a replacement for a spare wheel in a motor vehicle.

The invention also relates to a method for inflating and/or sealing a vehicle tire and in particular for dispensing a sealant for sealing a tire mounted on a rim of a vehicle wheel.

Such devices in the form of tire repair kits or breakdown kits and methods are known in diverse forms and designs. For example, if a tire on a vehicle becomes leaky and loses air, there is either the option of changing the tire, or a breakdown kit/tire repair kit is used. Changing a tire is laborious and difficult and, above all, a tire takes up a lot of space in the trunk. Moreover, due to the additional weight of the tire and rim there is an additional fuel consumption.

Breakdown kits or tire repair kits are the simpler and faster variant. Breakdown kits or tire repair kits of the known type can often be used either only for inflating a tire or for sealing and subsequently inflating a tire. Depending on whether the tire is intended only to be inflated or both sealed and inflated, a user connects either a hose to a compressor or a sealant container by means of a hose to, for example, a compressor and to the tire.

For example, document DE 20 2005 021 981 U1 describes an equipment kit for inflating and repairing inflatable objects, in particular tires, wherein the equipment kit has a compressor assembly, a container with a sealing liquid, and a connecting device for connecting the container to the compressor assembly and to an inflatable object or product for repair and inflation. The equipment kit furthermore has an outer housing which receives the compressor assembly and which defines a seat for the sealing liquid container. The container is removably received in the seat. The result of providing the connecting device for stably connecting the container to the compressor assembly is that, when the container is received in the seat, the container remains functionally connected to the compressor assembly.

The object of the present invention is to provide a tire repair kit for inflating and/or sealing, as required, a tire mounted on a rim of a vehicle wheel, wherein the handling of the tire repair kit is significantly simplified compared to the tire repair kits or breakdown kits known from the prior art. Furthermore, a corresponding method, in particular for repairing a defective tire, is to be provided.

This object is achieved in particular by the subject matter described herein, which relates to a tire repair kit for inflating and/or sealing, as required, a tire mounted on a rim of a vehicle wheel. Advantageous developments of the tire repair kit according to the invention are further described herein.

The object on which the invention is based is achieved with regard to the method by the subject matter described herein, which relates to a method for inflating and/or sealing a tire mounted on a rim of a vehicle wheel. Advantageous developments of the method according to the invention are further described herein.

The tire repair kit according to the invention is distinguished in particular by the fact that the tire repair kit can be mounted, in particular temporarily, on the vehicle wheel. In comparison to the tire repair kits or breakdown kits known from the prior art, this provides the decisive advantage that the user no longer has to disassemble and stow the tire repair kit after the tire repair.

Rather, provision is made according to the invention that, in the event of a puncture, for example, the user removes the tire repair kit for example from the trunk of the vehicle and places it on the rim of the vehicle wheel to be repaired and then activates the tire repair kit in order to inflate the tire accordingly and/or dispense a sealant accordingly. After the tire has been repaired or after the tire has been inflated and/or sealed, the tire repair kit remains mounted on the vehicle wheel rim or vehicle wheel and does not need to be removed.

In other words, the user can get back into the vehicle immediately after the completion of the inflation or sealing process and drive on, for example to an appropriate repair shop.

The solution according to the invention not only significantly simplifies the handling of the tire repair kit, but also increases traffic safety, since the user of the tire repair kit only has to leave the vehicle interior for a short time and is therefore put at less risk from traffic.

According to a further aspect of the invention, the tire repair kit therefore has an in particular cup-shaped or pot-shaped supporting body which, in particular as required, is exchangeably fastenable to the vehicle wheel rim and in particular is exchangeably receivable in the central recess of the vehicle wheel rim. The tire repair kit also has a compressor unit, which is connected to the in particular cup-shaped or pot-shaped supporting body and has a drive and a compressor portion with at least one working chamber.

In particular, the supporting body can have a size and/or geometry adapted to the central recess of the vehicle wheel rim. In this case, it is appropriate for the supporting body to be at least partially and preferably completely receivable in the central recess of the vehicle wheel rim.

Preferably, the supporting body is associated with in particular reversibly releasable connecting means, in particular in the form of snap-in connecting means, for releasably fixing the supporting body on the vehicle wheel rim. The fixing by means of the connecting means can be effected, for example, in that they interact in the central recess with correspondingly complementary connecting means. As an alternative or in addition thereto, however, the connecting means can also interact with other components of the vehicle wheel rim, for example by being clamped to the wheel bolts of the vehicle wheel rim.

The in particular reversibly releasable connecting means of the supporting body are preferably designed to fix the tire repair kit securely to the vehicle wheel rim even when the vehicle is moving.

According to implementations of the tire repair kit, the drive of the compressor unit is received at least partially or in regions in the supporting body.

Preferably, the drive of the compressor unit is an electric motor drive to which, as required and especially when the vehicle is stationary, the electrical energy necessary for operating the drive can be supplied, in particular via an electric line running at least in certain regions outside the vehicle.

In embodiments of the tire repair kit according to the invention, it is envisaged that the supporting body has a flange region via which the compressor portion is preferably releasably connected to the supporting body. In a state of the supporting body in which it is inserted in the central recess of the vehicle wheel rim, the compressor unit can be arranged at least partially and preferably completely outside the central recess of the vehicle wheel rim.

The tire repair kit can have, in particular optionally, a sealant container which preferably substantially has a toroidal and in particular rotationally toroidal shaping at least in certain regions.

The sealant container is in particular releasably fluidically connected or connectable to the compressor portion, and in particular to the at least one working chamber of the compressor portion, in such a manner that compressed air can be supplied, at least as required, to the sealant container in order to dispense a sealant.

Furthermore, the sealant container can preferably have a sealant outlet coupling, in particular in the form of a quick-action coupling, via which an outlet of the sealant container is fluidically connectable as required to a valve of the tire.

In this connection, it would be conceivable for the sealant container to be in particular releasably connected or connectable (mechanically) to the vehicle wheel rim and/or to the supporting body and/or to the compressor unit. However, a "free-standing" embodiment of the sealant container is also conceivable.

Accordingly, in accordance with embodiments of the tire repair kit according to the invention, the latter can have an in particular cup-shaped or pot-shaped supporting body which is exchangeably receivable in the central recess of the vehicle wheel rim in order to mount the tire repair kit, in particular temporarily, on the vehicle wheel.

According to these embodiments of the tire repair kit according to the invention, the tire repair kit can furthermore have a compressor unit having a drive and a compressor portion with at least one working chamber, and a sealant container which is toroidal and in particular rotationally toroidal at least in certain regions, wherein the sealant container which is toroidal and in particular rotationally toroidal at least in certain regions surrounds the compressor portion of the compressor unit at least partially or in regions.

In other words, in these embodiments of the tire repair kit according to the invention, all of the structural components necessary for dispensing a sealant or for inflating a tire as required are fully integrated in the tire repair kit.

In particular, in the solution according to the invention, the composition of the structural components of the tire repair kit is selected such that the tire repair kit has a particularly compact design adapted to the size and geometry of the rim of the vehicle wheel. Care is taken in this connection such that, when the tire repair kit is attached to the vehicle wheel rim, the vehicle width is increased only slightly, if at all, specifically even when a sealant container is connected to the compressor portion.

Said tire repair kit is distinguished, for example, by the fact that the sealant container of the tire repair kit according to the invention is constructed toroidally and in particular rotationally toroidally at least in certain regions. Such a shape guarantees a relatively large volume for the sealant to be provided, while at the same time the inner region of the toroidal shape can be used to receive the compressor portion of the compressor unit at least partially or in regions. This has the decisive advantage that only relatively short compressed air lines are required from the compressor portion of the compressor unit to the sealant container, and this, on the one hand, reduces the susceptibility to wear but also reduces any compressed air losses, on the other hand.

A further advantage of the toroidal shape of the sealant container which should be mentioned is that, when compressed air is introduced, optimal mixing and thus particularly efficient dispensing of the sealant can be realized.

Expressed in general terms, the tire repair kit according to the invention preferably has an overall at least substantially rotationally symmetrical structure, with the center of gravity of the tire repair kit being on the central axis of the vehicle wheel when the tire repair kit is mounted on the vehicle wheel rim. This applies even when, in the tire repair kit, the sealant container is connected to the compressor portion. In this way, there is no imbalance or only a small imbalance, if any at all, when the vehicle is driven with the tire repair kit mounted on the vehicle wheel rim.

According to preferred embodiments of the tire repair kit according to the invention, it is envisaged that the supporting body has a size and/or geometry adapted to the central recess of the vehicle wheel rim. In particular, the supporting body of the tire repair kit is dimensioned and designed such that the supporting body can preferably be received completely in the central recess of the vehicle wheel rim.

In principle, it is appropriate for the supporting body to have in particular reversibly releasable connecting means in order to fix the supporting body, preferably releasably, on the vehicle wheel rim, for example in the central recess of the vehicle wheel rim or on wheel bolts of the vehicle wheel rim.

The in particular reversibly releasable connecting means can be, for example, snap-in connecting means, such as snap-in lugs, which automatically latch into the central recess when the supporting body is inserted and accordingly fix the supporting body.

In particular, in this connection, the in particular reversibly releasable connecting means of the supporting body should advantageously be designed such that the tire repair kit is securely fixed to the vehicle wheel rim even when the vehicle is moving. This applies even when, in the tire repair kit, the sealant container is connected to the compressor portion.

"Secure fixing" of the tire repair kit on the vehicle wheel rim or the vehicle wheel should be understood in particular as meaning that it remains firmly attached to the vehicle wheel at a speed of up to, for example, 100 km/h, even if the vehicle wheel is exposed to vibrations or lateral accelerations.

Furthermore, it is advantageous that the supporting body has a sort of flange region via which the compressor unit is preferably releasably connected to the supporting body. In a state of the supporting body in which it is inserted in the central recess of the vehicle wheel rim, the compressor unit and the sealant container, which is toroidal and in particular rotationally toroidal at least in certain regions, are preferably arranged completely outside the central recess of the vehicle wheel rim.

This embodiment affords various advantages. In particular, a particularly compact design is achieved, with the center of gravity of the tire repair kit lying on the axis of rotation of the vehicle wheel and in particular within the central recess of the vehicle wheel rim, at least in a state in which the sealant container is emptied at least in certain regions. In this way, the tire repair kit can be stored particularly securely on the vehicle wheel rim.

According to implementations of the tire repair kit according to the invention, the compressor unit has at least one compressed air coupling which is fluidically connected to a pressure side of the compressor portion, in particular in the form of a quick-action coupling.

As an alternative or in addition thereto, the sealant container preferably has at least one compressed air coupling, in particular in the form of a quick-action coupling.

Compressed air can then be applied to the sealant container as required via the at least one compressed air coupling of the compressor unit and/or via the at least one compressed air coupling of the sealant container.

In particular, quick-action couplings are preferred as compressed air couplings in this connection, said couplings permitting easy assembly of the tire repair kit and easy removal of the tire repair kit if, for example, components of the tire repair kit have to be serviced or replaced.

In the same way, it is appropriate for the sealant container to have at least one sealant outlet coupling, in particular in the form of a quick-action coupling, via which an outlet of the sealant container is fluidically connectable as required to a valve of the tire. For this purpose, the tire repair kit preferably includes a corresponding fluid line which is connectable to the sealant outlet coupling of the sealant container and which, on the other hand, is fluidically connectable to the tire valve of the tire to be treated via a corresponding extension or a corresponding adapter.

With regard to the center of gravity of the tire repair kit, it is advantageous that the drive of the compressor unit is received at least partially or in regions and preferably completely in the supporting body. This ensures that, in a state when the supporting body is received in the central recess of the vehicle wheel rim, the center of gravity of the tire repair kit also preferably falls in the central recess of the vehicle wheel rim.

The drive of the compressor unit can be an electric motor drive, for example. As an alternative thereto, other drives are of course also conceivable. However, an electric motor drive is appropriate insofar as it can be plugged for example into a 12-volt socket in the vehicle to feed the drive, for example via an electric line (extension cable) running at least in certain regions outside the vehicle, as required.

Thus, after inserting the tire repair kit or the supporting body into the central recess of the vehicle wheel rim and after connecting the sealant outlet coupling of the sealant container to the valve of the tire, the user only has to plug the extension cable into the socket of an on-board cigarette lighter, for example, in order to supply the electrical energy required to operate the drive of the compressor unit to the drive. Of course, this only takes place when the vehicle is stationary.

According to a further aspect of the present invention, it is envisaged that the sealant container is releasably and/or exchangeably connected or connectable to the compressor unit and/or to the supporting body. This ensures that the sealant container can be connected to the compressor unit only when required, for example when the tire needs to be sealed. Furthermore, the sealant container can be correspondingly replaced after use of the tire repair kit.

At least one fastening means, in particular in the form of a screw, a quick-action closure and/or a quick-action securing means, can be associated with the sealant container for the releasable and/or exchangeable connection of the sealant container to the compressor unit and/or the supporting body.

In this connection, it is appropriate for the sealant container to preferably have a flange region which is in particular arranged distally with respect to the supporting body and which encompasses, at least in certain regions, the central opening of the toroidal and in particular rotationally toroidal sealant container. Advantageously, in the preferably provided flange region there is a bore which is arranged centrally with regard to an axis of rotation of the toroidal and in particular rotationally toroidal sealant container, by which bore a fastening means, in particular in the form of a screw, a quick-action closure and/or a quick-action securing means, can be received at least in certain regions.

The sealant container is preferably connected to the compressor unit and/or the supporting body via a single fastening means, in particular in the form of a screw, a quick-action closure and/or a quick-action securing means. In this way, a particularly quick exchange or a particularly quick replacement of the sealant container is possible.

In particular, the single fastening means is intended to lie on the axis of rotation of the tire repair kit so that no imbalance occurs in a state in which the vehicle is moving again with the tire repair kit is still attached to the vehicle wheel rim.

As an alternative or in addition to the aforementioned embodiments, it is envisaged according to implementations of the tire repair kit according to the invention that the sealant container has an interface region via which the sealant container is releasably and/or exchangeably connectable or connected to the compressor unit and/or to the supporting body.

In order to prevent the sealant container from protruding too far from the vehicle wheel rim when the tire repair kit is mounted on the vehicle wheel rim, it is envisaged in particular that the sealant container is at least substantially flat (level) on a side opposite the interface region.

According to exemplary embodiments of the tire repair kit according to the invention, it is envisaged that, in a state in which the sealant container is connected to the supporting body and/or to the compressor unit, the tire repair kit has at least substantially a rotationally symmetrical, in particular mushroom-shaped structure, wherein preferably the sealant container is connected to the compressor unit and/or to the supporting body via a single fastening means, in particular in the form of a screw, a quick-action closure and/or a quick-action securing means, wherein the single fastening means is located in particular on the axis of rotation of the tire repair kit. This provides a particularly compact solution for the tire repair kit.

Expressed in general terms, it is advantageous for the tire repair kit to have at least substantially a rotationally symmetrical, in particular mushroom-shaped, structure. Such a rotationally symmetrical structure allows the vehicle to continue driving despite the tire repair kit being installed, without at least a noticeable change in the driving characteristics occurring or a change that would disrupt the driving performance, since no imbalance is generated by the tire repair kit.

According to implementations of the tire repair kit according to the invention, it is envisaged that the sealant container has two preferably at least substantially identical but mirror-inverted toroidal segment-shaped regions which are preferably fluidically connected to one another. The two toroidal segment-shaped regions each have two mutually facing end faces.

In this connection, it is appropriate for at least one compressed air connection for supplying compressed air to the sealant container and at least one sealant outlet to be arranged between the mutually facing end faces of the two toroidal segment-shaped regions. In particular, the at least one compressed air connection and the at least one sealant outlet are intended preferably to be arranged opposite one another.

This has the advantage that the compressed air fed into the sealant container only reaches the sealant outlet after a relatively long distance through the sealant container, which allows a particularly efficient mixing and expulsion of the sealant from the sealant container.

The compressor unit of the tire repair kit according to the invention can in particular comprise a compressor as a compressor portion, which is preferably coupled to the drive. In principle, the compressor unit can also be associated with a buffer unit which, for example, provides (electrical) energy for a limited operating period.

According to exemplary embodiments of the tire repair kit according to the invention, the compressor unit comprises a drive and a compressor portion with at least one working chamber, wherein the drive and the compressor portion are arranged offset axially with respect to each other. In particular, in this connection, the compressor portion is intended to face an outside and the drive an inside, with the compressor unit, when the tire repair kit is mounted on the vehicle wheel, being received at least partially along its axial extent in the central recess, for example the central hole in the vehicle wheel rim.

The compressor unit is preferably of modular design and can in particular have a compressor shaft which is arranged in particular parallel to a central axis of the vehicle wheel when the tire repair kit is mounted on the vehicle wheel. The compressor shaft preferably coincides with the central axis of the vehicle wheel. The compressor shaft drives the compressor.

According to a development of this embodiment, a drive of the compressor unit has a longitudinal axis which is arranged parallel to the central axis of the vehicle wheel when the tire repair kit is arranged on the vehicle wheel, with the drive being coupled directly or indirectly to the compressor shaft.

Alternative configurations, in which the compressor shaft is spaced apart from the central axis and arranged parallel thereto, are conceivable. It is self-evident that at least one transmission stage or gear stage can be interposed between the drive and the compressor portion.

According to exemplary embodiments of the tire repair kit, the compressor unit comprises a plurality of working chambers which, in a state when the tire repair kit is mounted on the vehicle wheel, are preferably arranged grouped around a central axis of the vehicle wheel. The working chambers are designed in particular as displacement chambers or displacement cylinders. Preferably, the working chambers are arranged offset about the central axis, for example in a star shape or lying opposite one another.

According to a further exemplary embodiment of the tire repair kit according to the invention, the compressor unit is designed as a piston compressor unit, the compressor unit comprising at least one piston, in particular a reciprocating piston or rotary piston, which is preferably driveable via an eccentric coupling drive.

In a state in which the tire repair kit is mounted on the vehicle wheel, the piston is preferably oriented perpendicularly to the central axis. The at least one piston can be designed as a cylinder piston. However, the piston can also be designed as an oval piston or flat piston and can comprise a non-circular cross section. The working chamber is adapted to the shape of the piston.

According to a modification of at least one of the previously described embodiments, the compressor unit has at least two working chambers which are configured as working cylinders and are arranged around the central axis of the vehicle wheel when the tire repair kit is mounted on the vehicle wheel. A direction of longitudinal extent of the working cylinders is preferably oriented perpendicularly to the central axis. The working chambers can be arranged approximately in a star shape around the central axis.

According to a development, the compressor unit has at least one double piston, preferably a rigid double piston, with the double piston having two piston portions which face away from one another and are connected to one another via a drive component. In this way, a complex crank mechanism can be omitted. The eccentric coupling drive can have a simple design.

According to a development of this embodiment, the drive component has a slotted guide in which a sliding piece or sliding block is guided, the sliding piece revolving eccentrically during operation, and the drive component being translationally driveable by the sliding piece in order to compress the pressure fluid in the working cylinders. That piston-carrying drive component can be driven in a longitudinally oscillating manner.

According to a modification of at least one of the previously described embodiments, the compressor unit of the tire repair kit according to the invention has a plurality of pistons which are axially offset from one another and which are driveable via a common compressor shaft which has a plurality of eccentric portions. There is preferably a plurality of rows of pistons which are axially offset from one another.

As already stated, the present invention also relates to a method for inflating and/or sealing a tire mounted on a rim of a vehicle wheel.

In this case, a tire repair kit of the previously described type according to the invention is provided and the supporting body of the tire repair kit is placed into the central recess of the vehicle wheel rim. Furthermore, a compressed air outlet of the compressor unit is fluidically connected to the tire valve of the tire and the drive of the compressor unit is activated.

After deactivation of the drive of the compressor unit, the tire repair kit can remain in its state mounted on the vehicle wheel rim, even if the vehicle resumes moving.

The present invention also relates to a method for dispensing a sealant for sealing a tire mounted on a rim of a vehicle wheel.

Provision is made firstly to provide a tire repair kit of the previously described type according to the invention. The supporting body of the tire repair kit is then inserted into the central recess of the vehicle wheel rim, a sealant outlet of the sealant container is fluidically connected to the tire valve of the tire to be sealed and the drive of the compressor unit is activated.

In order to activate the drive of the compressor unit, electrical energy is preferably supplied from the vehicle electric system to said drive via an electric line (for example in the form of an extension cable) running at least in regions outside the vehicle wheel rim and the vehicle.

According to one aspect of the method according to the invention, it is envisaged that the drive of the compressor unit is deactivated or deactivatable manually or automatically, preferably optionally automatically, in particular when an actual pressure in the tire to be sealed, which pressure is preferably measurable or determinable by the tire repair kit, reaches or has reached a previously defined or definable target pressure.

In particular, the solution according to the invention is characterized in that, after the drive of the compressor unit is deactivated, the tire repair kit remains or can remain in its mounted state on the vehicle wheel rim, even if the vehicle resumes moving.

This aspect provides the decisive advantage that—should the tire pressure drop again after the sealant has been introduced into the tire to be sealed, because for example the sealant settles, the user of the tire repair kit only has to activate the drive of the compressor unit again to bring the actual pressure in the tire to the target pressure. Since the tire repair kit is still in its mounted state on the vehicle wheel rim, this can be done by the user in a few steps.

According to a further aspect of the invention, it is envisaged that the sealant container of the tire repair kit is replaced after the sealant has been applied.

BRIEF DESCRIPTION OF THE DRAWINGS

An exemplary embodiment of the tire repair kit according to the invention will be described in more detail below with reference to the accompanying drawings.

In the drawings.

DETAILED DESCRIPTION

The tire repair kit 1 shown in the drawings serves to inflate and/or seal, as required, a tire mounted on a rim of a vehicle wheel 2, wherein the tire repair kit 1 can be mounted, in particular temporarily, on the vehicle wheel 2 or on the vehicle wheel rim.

For this purpose, the exemplary embodiment of the tire repair kit 1 according to the invention essentially has a cup-shaped or pot-shaped supporting body 3 which can be exchangeably received in the central recess 4 (i.e. in particular in the central hole) of the vehicle wheel 2.

Furthermore, the tire repair kit 1 has a compressor unit 5 with a drive 6 and a compressor portion 7 with at least one working chamber.

Figure 5:
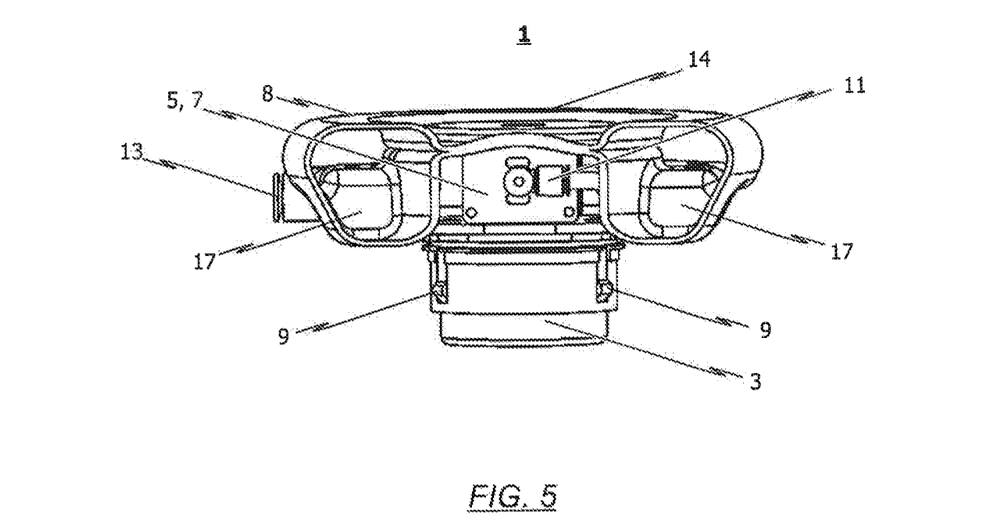
FIG. 5 shows, schematically and in a partially sectioned view, the tire repair kit according to FIG. 4.

In addition, the tire repair kit 1 optionally includes a sealant container 8 which is toroidal and, in particular, rotationally toroidal, at least in certain regions and which, as can be gathered, for example, in FIG. 5, surrounds the compressor portion 7 with the compressor unit 5 at least partially or in certain regions.

Figure 6:
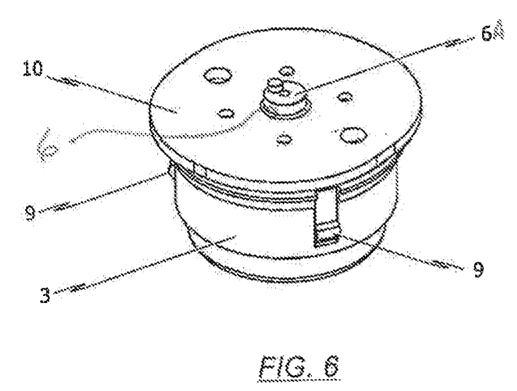
FIG. 6 shows, schematically and in an isometric view, the supporting body of the exemplary embodiment of the tire repair kit according to the invention with the drive of the compressor unit arranged at least in certain regions in the supporting body.

The in particular cup-shaped or pot-shaped supporting body 3 of the tire repair kit 1 that is for example shown in FIG. 6 has a size and/or geometry adapted to the central recess 4 of the vehicle wheel 2, specifically such that that the supporting body 3 can preferably be completely received in the central recess 4 of the vehicle wheel 2.

Furthermore, for example, it can be gathered from the illustration in FIG. 6 that the supporting body 3 has in particular reversibly releasable connecting means 9, in particular in the form of snap-in connecting means, which are used to releasably fix the supporting body 3 in the central recess 4 of the vehicle wheel 2.

The in particular reversibly releasable connecting means 9 of the supporting body 3 are preferably designed such that the tire repair kit 1 is securely fixed to the vehicle wheel 2 even when the vehicle is moving.

As is likewise indicated in FIG. 6, the exemplary embodiment of the tire repair kit 1 according to the invention provides that the preferably electric motor drive 6 of the compressor unit 5 is received at least partially or in certain regions and preferably completely in the supporting body 3. In FIG. 6, an eccentric coupling drive 6A of the drive 6 is guided through a central hole arranged centrally in a flange region 10 of the supporting body 3.

The compressor portion 7 of the compressor unit 5 is preferably releasably connected to the supporting body 3 via the flange region 10 of the supporting body 3. In this connection, for example, reference is made to the illustration in FIG. 7.

It is preferably provided that, in a state of the supporting body 3 in which it is inserted in the central recess 4 of the vehicle wheel 2, the compressor unit 5 and the sealant container 8, which is toroidal and in particular rotationally toroidal at least in certain regions, are preferably arranged completely outside the central recess 4 of the vehicle wheel 2.

Figure 7:
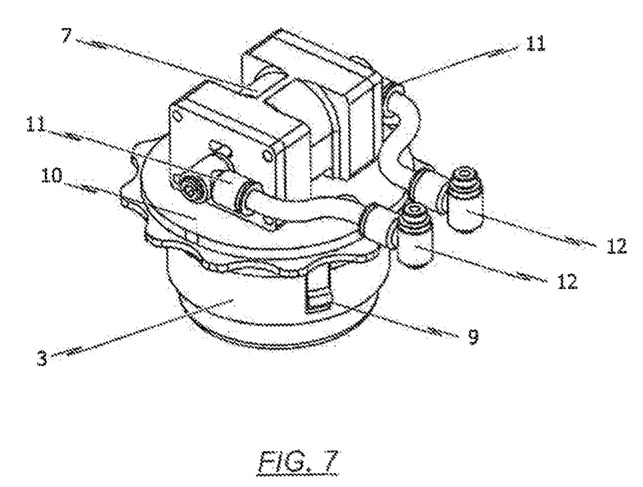
FIG. 7 shows, schematically and in an isometric view, the supporting body according to FIG. 6, wherein the compressor portion of the compressor unit is connected to the supporting body via a flange region of the supporting body.
Figure 8A:
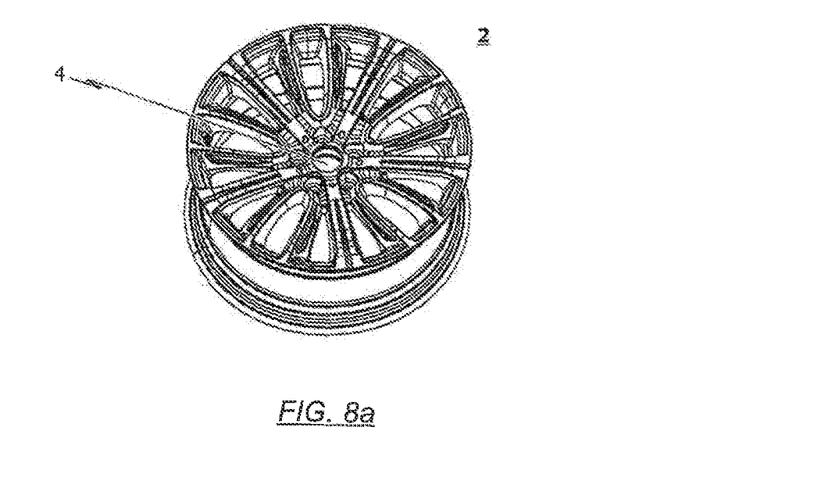
FIG. 8a shows, schematically and in an isometric view, an exemplary embodiment of a vehicle wheel without a tire mounted on the rim.
Figure 8B:
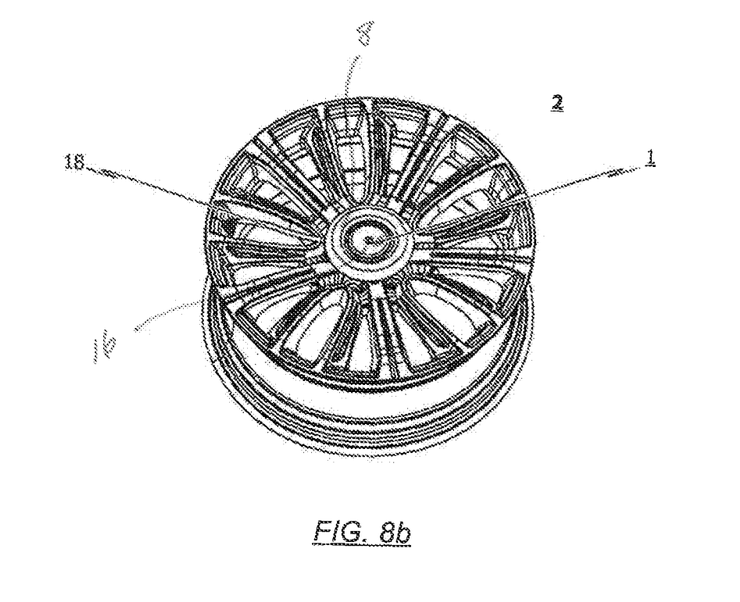
FIG. 8b shows, schematically and in an isometric view, the vehicle wheel according to FIG. 8a, with the exemplary embodiment of the tire repair kit according to the invention according to FIG. 1 being mounted on the rim of the vehicle wheel.

It can furthermore be gathered in FIG. 7 that the compressor portion 7 has two compressed air couplings 11 in the form of quick-action couplings, each of which is fluidically connected to a pressure side or to a working chamber of the compressor portion 7.

In the exemplary embodiment shown in the drawings, in particular a compressor portion 7 with two opposite working chambers is used as the compressor portion 7, with the fluid (air) to be compressed being alternately compressed in the two working chambers via a piston driveable by the eccentric coupling drive 6A. For this purpose, in the case of the compressor unit 5 shown in FIG. 7, use is also made of a total of two compressed air couplings 11 which are in the form of quick-action couplings and each of which is fluidically connected to a working chamber of the compressor portion 7.

In the same way, two compressed air couplings 12 in the form of quick-action couplings are assigned to the sealant container 8 such that compressed air couplings 11 of the compressor unit 5 and the sealant container 8, via the two compressed air couplings 12 of the sealant container 8 and the respective connecting lines connected in between, can be pressurized with compressed air as required.

Figure 1:
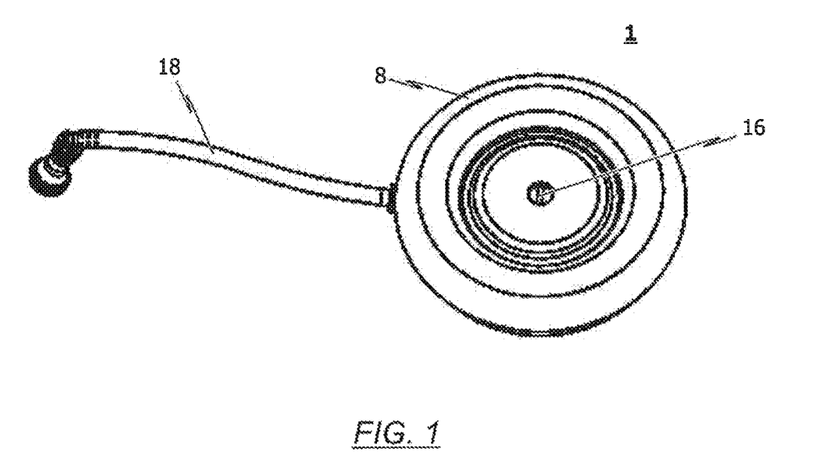
FIG. 1 shows schematically and in an isometric view from above an exemplary embodiment of the tire repair kit according to the invention with a connecting line connected to the sealant container in particular via a clip connection or bayonet connection or another quick-action coupling.
Figure 2:
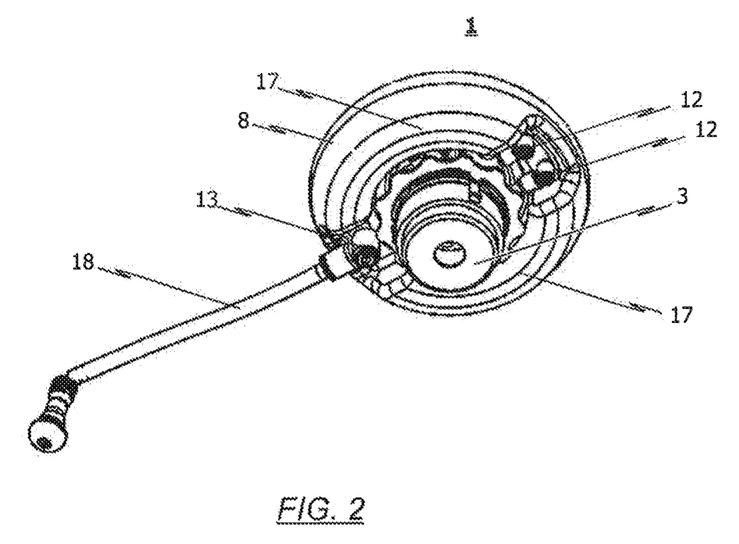
FIG. 2 shows, schematically and in an isometric view from below, the exemplary embodiment of the tire repair kit according to the invention.

As can be gathered in particular from the illustrations in FIG. 1 and FIG. 2, the sealant container 8 of the exemplary embodiment of the tire repair kit 1 according to the invention is assigned a sealant outlet coupling 13 in the form of a quick-action coupling, via which the outlet of the sealant container 8 is fluidically connectable as required, for example via a connecting line 18, to a valve of the tire.

It can be gathered in particular from the partially sectioned view in FIG. 5 that the sealant container 8 has two at least substantially identical or mirror-inverted toroidal segment-shaped regions 17 which are preferably fluidically connected to one another.

Figure 3:
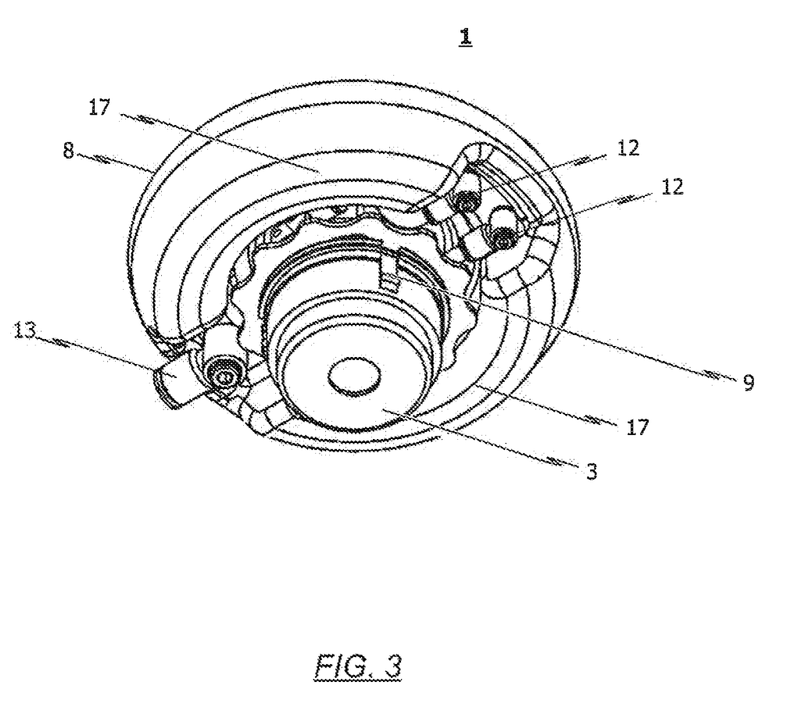
FIG. 3 shows, schematically and in an isometric view from below, the tire repair kit according to FIG. 2, but without the connecting line connected to the sealant container.
Figure 4:
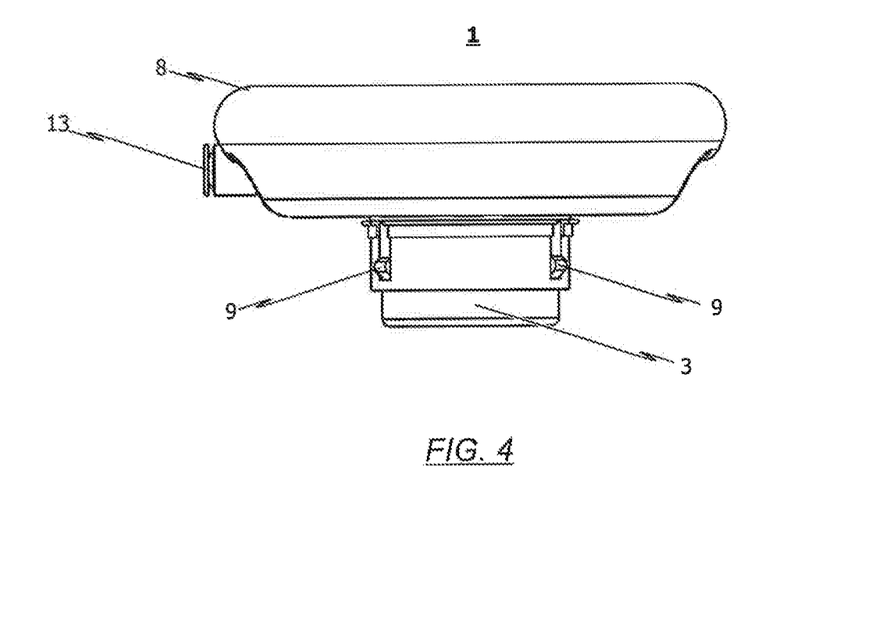
FIG. 4 shows, schematically and in a side view, the tire repair kit according to FIG. 3.

It can be gathered from the view from below (for example FIG. 2 or FIG. 3) that the two compressed air connections 12 of the sealant container 8, which are used to supply compressed air to the sealant container 8, and the sealant outlet 13 are arranged opposite one another, namely in each case between two mutually facing end faces of the two toroidal segment-shaped regions 17.

The sealant container 8 is releasably and/or exchangeably connected to the compressor unit 5 and/or to the supporting body 3.

In the exemplary embodiment of the tire repair kit 1 according to the invention that is shown in the drawings, it is envisaged in this connection that the sealant container 8 has a flange region 14 or flange-like region which is arranged, in particular distally, with respect to the supporting body 3 and which spans the central opening of the toroidal and in particular rotationally toroidal sealant container 8 at least in certain regions.

In the flange region 14 or flange-like region there is a bore 15 which is arranged centrally with respect to an axis of rotation of the toroidal and in particular rotationally toroidal sealant container 8 and by which a fastening means 16, in particular a screw, can be received at least in certain areas.

The sealant container 8 is preferably connected to the compressor unit 5 and/or to the supporting body 3 via a single screw 16, the single screw 16 lying in particular on the axis of rotation of the tire repair kit 1.

The invention is not restricted to the exemplary embodiment of the tire repair kit 1 according to the invention shown in the drawings, but results from an overall view of all the features disclosed herein.

LIST OF REFERENCE SIGNS 1 tire repair kit
2 vehicle wheel rim
3 supporting body
4 central recess of the vehicle wheel rim
5 compressor unit
6 drive
6A eccentric coupling drive of the drive of the compressor unit
7 compressor portion
8 sealant container
9 connecting means of the supporting body
10 flange region of the supporting body
11 compressed air coupling of the compressor portion
12 compressed air coupling of the sealant container
13 sealant outlet coupling of the sealant container
14 flange region of the sealant container
15 centrally arranged bore
16 fastening means
17 toroidal segment-shaped regions of the sealant container
18 connecting line

The invention claimed is:

1. A tire repair kit for at least one of inflating and sealing a tire mounted on a rim of a vehicle wheel, wherein the tire repair kit is configured to be mounted on the vehicle wheel, the tire repair kit comprising:
a cup-shaped or pot-shaped supporting body exchangeably fastenable to the vehicle wheel and exchangeably receivable in a central recess of the vehicle wheel, the supporting body having a flange region; and
a compressor unit including a drive and a compressor portion, wherein the compressor portion has at least one working chamber, wherein the drive and the compressor portion are arranged axially offset with respect to each other, wherein the drive is received inside of the supporting body, and the compressor portion is releasably connected to the flange region and is outside of the supporting body, and wherein, with the supporting body inserted into the central recess of the vehicle wheel, the compressor unit is arranged at least partially within and at least partially outside of the central recess.

2. The tire repair kit as claimed in claim 1, wherein the supporting body has at least one of a size and a geometry adapted to the central recess such that the supporting body is at least partially receivable in the central recess, wherein the supporting body is associated with a releasable connecting means in the form of a snap-in connecting means for releasably fixing the supporting body on the vehicle wheel, wherein the reversibly releasable connecting means is configured to fix the tire repair kit securely to the vehicle wheel even when the vehicle is moving.

3. The tire repair kit as claimed in claim 1, wherein the drive of the compressor unit is received at least partially or in certain regions in the supporting body the drive of the compressor unit is an electric motor drive to which electrical energy for operating the drive can be supplied.

4. The tire repair kit as claimed in claim 1, further comprising a sealant container having a toroidal shaping at least in certain regions thereof, wherein the sealant container is releasably connected or connectable fluidically to the compressor portion such that compressed air can be supplied to the sealant container to dispense a sealant, wherein the sealant container has a sealant outlet coupling via which an outlet of the sealant container is fluidically connectable as required to a valve of the tire.

5. The tire repair kit as claimed in claim 4, wherein the sealant container is releasably connected or connectable to at least one of the vehicle wheel, the supporting body, and the compressor unit.

6. The tire repair kit as claimed in claim 4, wherein at least one of the compressor unit and the sealant container has at least one compressed air coupling fluidically connected to a pressure side of the compressor portion, and wherein compressed air can be applied to the sealant container via the at least one compressed air coupling of the at least one of the compressor unit and the sealant container.

7. The tire repair kit as claimed in claim 4, wherein the sealant container is at least one of releasably and exchangeably connectable or connected to at least one of the compressor unit and the supporting body, wherein, for this purpose, at least one fastening means is assigned to the sealant container.

8. The tire repair kit as claimed in claim 4, wherein the sealant container has an interface region via which the sealant container is at least one of releasably and exchangeably connectable or connected to the at least one of the compressor unit and the supporting body, wherein the sealant container is at least substantially flat on a side opposite the interface region.

9. The tire repair kit as claimed in claim 4, wherein the sealant container is connected to the at least one of the compressor unit and the supporting body via a single fastening means on the axis of rotation of the tire repair kit.

10. The tire repair kit as claimed in claim 5, wherein the sealant container has two at least substantially identical but mirror-inverted toroidal segment-shaped regions fluidically connected to one another and which each have two end faces facing one another, wherein, with the sealant container is connected to the at least one of the supporting body and the compressor unit, at least one compressed air connection for supplying compressed air to the sealant container and at least one sealant outlet are arranged between the mutually facing end faces of the two toroidal segment-shaped regions, wherein the at least one compressed air connection and the at least one sealant outlet are arranged opposite one another.

11. A method for at least one of inflating and sealing a tire mounted on a rim of a vehicle wheel with a tire repair kit including a supporting body having a flange region, and a compressor unit having a drive and a compressor portion, wherein the drive and the compressor portion are arranged axially offset with respect to each other, wherein the drive is received inside of the supporting body, and the compressor portion is releasably connected to the flange region and is outside of the supporting body, and wherein, with the supporting body inserted into a central recess of the vehicle wheel, the compressor unit is arranged at least partially within and at least partially outside of the central recess, the method comprising:

inserting the supporting body of the tire repair kit into the central recess of the vehicle wheel;

fluidically connecting a compressed air outlet of the compressor unit to a valve of the tire; and activating the drive of the compressor unit.

12. The method as claimed in claim 11, wherein activating the drive of the compressor unit comprises supplying electrical energy from an electric system of a vehicle to which the vehicle wheel is mounted to the drive via an electric line running at least in certain regions outside the vehicle wheel and the vehicle.

13. The method as claimed in claim 11, further comprising, upon an actual pressure in the tire reaching or having reached a previously defined or definable target pressure, deactivating the drive of the compressor unit manually or automatically, and maintaining the tire repair kit mounted on the vehicle wheel, after the drive of the compressor unit is deactivated, even if the vehicle resumes moving.

14. The method as claimed in claim 11, wherein fluidically connecting the compressed air outlet of the compressor unit to the valve of the tire comprises indirectly fluidically connecting the compressed air outlet of the compressor unit to the valve of the tire with the interposition of a sealant container for dispensing a sealant.

15. The tire repair kit as claimed in claim 1, wherein, with the supporting body inserted into the central recess of the vehicle wheel, the drive of the compressor unit is arranged at least in certain regions of the central recess and the compressor portion of the compressor unit is completely outside the central recess.

\* \* \* \* \*